United States Patent [19]

Nagasawa et al.

[11] Patent Number: 6,055,357
[45] Date of Patent: Apr. 25, 2000

[54] SIGNAL RECORDING APPARATUS

[75] Inventors: Kenichi Nagasawa, Kanagawa-ken; Akio Aoki; Motokazu Kashida, both of Tokyo; Shinichi Yamashita, Kanagawa-ken; Makoto Shimokoriyama, Kanagawa-ken; Toshihiro Yagisawa, Kanagawa-ken, all of Japan

[73] Assignee: Canon Kabushiki Kaisha, Tokyo, Japan

[21] Appl. No.: 08/347,848

[22] Filed: Dec. 1, 1994

Related U.S. Application Data

[60] Continuation of application No. 08/017,517, Feb. 12, 1993, abandoned, which is a division of application No. 07/498,047, Mar. 22, 1990, Pat. No. 5,218,454.

[30] Foreign Application Priority Data

| Mar. 28, 1989 | [JP] | Japan | ................................. 1-077055 |
| Mar. 28, 1989 | [JP] | Japan | ................................. 1-077056 |
| Mar. 28, 1989 | [JP] | Japan | ................................. 1-077057 |

[51] Int. Cl.[7] ................................................ H04N 5/928
[52] U.S. Cl. ......................................... 386/96; 386/104
[58] Field of Search .................................... 358/335, 342, 358/341, 310, 431, 261.1; 348/432, 445, 461, 462; 360/32, 33.1, 19.1; 386/46, 109, 112, 124, 92, 96, 98, 104, 105; H04N 5/928

[56] References Cited

U.S. PATENT DOCUMENTS

| 4,791,680 | 12/1988 | Yokoe et al. | ................. 358/261.1 |
| 4,862,292 | 8/1989 | Enari et al. | ................. 358/335 |
| 4,914,527 | 4/1990 | Asai et al. | ................. 358/343 |
| 5,012,352 | 4/1991 | Yoshimura et al. | ................. 358/343 |
| 5,191,487 | 3/1993 | Nakamura et al. | ................. 358/341 |

*Primary Examiner*—Huy Nguyen
*Attorney, Agent, or Firm*—Robin, Blecker & Daley

[57] ABSTRACT

A signal recording apparatus, for recording a TV signal in which an audio signal such as a MUSE signal and a video signal are multiplexed in a time sharing manner in units of a given period of time, is arranged to code these video and audio signals alike, to dispersively allocate a discretely separated audio signal within the video signal, and to provide symbols other than the symbols the audio and video signals within each of synchronizing block for the purpose of permitting the use of other video signal recording apparatuses. The arrangement permits simplification and high-quality of the apparatus for recording the signals of this kind and thus contributes to the popularization of the apparatus.

8 Claims, 15 Drawing Sheets

SIGNAL RECORDING APPARATUS

This is a continuation application under 37 CFR 1.62 of prior application Ser. No. 08/017,517, filed Feb. 12, 1993, abandoned, which is a division of Ser. No. 07/498,047, filed Mar. 22, 1990 (now U.S. Pat. No. 5,218,454).

BACKGROUND OF THE INVENTION

1. Field of the Invention

This invention relates to a signal recording apparatus and more particularly to an apparatus for recording a video signal and other signals related to the video signal.

2. Description of the Related Art

Research for apparatuses of the kind handling high-definition (hereinafter referred to as high-vision) TV signals have progressed during recent years. As a result, various technical methods have been developed for image sensing, signal transmission, recording and reproduction.

For broadcast transmission, a method called a MUSE (multiple sub-Nyquist-sampling encoding) method has been proposed. A signal to be transmitted by the MUSE method (hereinafter referred to simply as a MUSE signal) is obtained as follows: the band of a high-vision signal is compressed to a great extent. A digital audio signal which has been time-compressed is time-division-multiplexed along with the compressed high-vision signal. The signal thus obtained is converted into an analog signal before it is transmitted through an analog transmission line.

FIG. 1 of the accompanying drawings shows one frame amount of the MUSE signal processed for transmission. As shown, the transmission signal of the MUSE signal consists of 1,125 lines per frame. The signal is transmitted line by line in sequence. In FIG. 1, a reference symbol Y denotes a luminance signal which is obtained by converting a sampled value into an analog signal. A symbol C denotes a chrominance signal. A symbol A denotes an audio signal which is obtained by converting a temporarily digitized audio signal into a three-valued signal. A symbol FP/VIT denotes a signal VIT which indicates information about transmission line equalization, etc., and a frame pulse FP. A symbol GU denotes a guard space. A symbol CON denotes a control signal. A symbol BL denotes blank data. A symbol CP denotes a symbol for clamp level information. Numerical values shown in FIG. 1 indicate the numbers of data obtained in a digital region before the transmission signal is converted into an analog signal.

Further details of each symbol shown in FIG. 1 are disclosed in "High-Vision Technique", Chap. 3, Para. 3.1 and 3.2, issued Nov. 25, 1988, compiled by NHK Broadcasting Technical Research Center. Therefore, the details are omitted from the following description.

In accordance with the MUSE method, the transmission band of the high-vision signal can be lowered a sufficient degree. Besides, the high-vision signal can be transmitted without much degradation of picture quality. The method is advantageous in these respects.

However, a VTR which is arranged to record and reproduce the above-stated MUSE signal on and from a magnetic recording medium presents the following problem.

Generally, a magnetic recording and reproducing system must be arranged taking into consideration the possibility of a drop-out, which results from dust or the like sticking to a recording medium, blinding of a magnetic head, etc. In other words, there is a possibility that the signal becomes unreproducible for a continuous period. In the case of digital recording, for example, this causes a so-called burst error and thus brings about a serious signal deterioration. In the event of such drop-out, the drop-out part of the signal is generally compensated for by an interpolation process utilizing the correlativity of the signal. In the case of a video signal, for example, a signal part adjacent to the drop-out part on the picture is inserted in the drop-out part in such a way as to compensate for the drop-out.

With respect to the audio signal, a short dropout can be compensated for, for example, by holding the level of an immediately preceding part. However, it would be hardly possible to effectively compensate for a drop-out part if it lasts for a long period of time. In that event, the drop-out part is reproduced as a large noise.

In the case of the above-stated MUSE signal, the audio signal is continuously transmitted with each frame-period amount of it time-division-compressed. Therefore, when the MUSE signal is recorded and reproduced, some part of the audio signal might drop out for a considerably long period of time. Under such a condition, the audio signal cannot be adequately reproduced.

This problem is not peculiar to the MUSE signal. It applies particularly to all the apparatuses that are arranged to record a TV signal obtained by time-division-multiplexing a given period amount of video signal with the same period amount of audio signal.

Further, the MUSE signal has a considerably wide band. In transmitting it in a digitized state, therefore, the amount of data thereof is preferably compressed by means of a so-called high-efficiency encoding circuit. However, the MUSE signal consists of a luminance signal, a chrominance signal and the audio signal which are multiplexed in a time sharing manner. Therefore, transmission of them in the high-efficiency-coded state necessitates use of a large circuit arrangement. In other words, for high-efficiency-encoding a signal in which a video signal and an audio signal are multiplexed in a time sharing manner, these component signals must be first separated from each other in general. After that, the video and audio signals thus separated must be processed by separate signal processing systems and then further separately subjected to the high-efficiency encoding process. The signal thus requires a complex processing arrangement.

Further, the video and audio signals included in the MUSE signal are in utterly different signal forms. The signal processing circuits for them must be arranged in totally different manners. In other words, the luminance and chrominance signals are analog signals corresponding to the amplitudes indicated by the respective symbols of the digital signals. Meanwhile, the audio signal is an analog signal obtained by converting a digitized two-valued audio signal into a three-valued signal. Therefore, the digital process circuit elements must be separately arranged to handle a different number of data bits in different manners.

In cases where the MUSE signal is to be transmitted, recorded or reproduced by using an apparatus in common with some other video signal which is a baseband signal or the like obtained by digitizing a high-vision signal as it is, both the video signal and audio signal processing systems of the apparatus are not usable for the other video signal. Therefore, in such a case, the size of the apparatus greatly increases.

Further, generally, digital signals of different bit rates obtained by sampling information signals at different sampling frequencies are recorded by different apparatuses. Even in a case where the difference in bit rate between these different digital signals is not much thus permitting common use of mechanical parts, it has been necessary to separately arrange the signal processing parts for them.

For example, a digital signal which is obtained by band-compressing the baseband signal of a high-vision (high definition TV) signal for recording differs, both in bit rate and signal form, from the digital signal before transmission of a MUSE signal which is prepared for high-vision (high-definition) transmission. Hence, utterly different digital VTRs have been used for recording these digital signals. However, the existence of VTRs of such different kinds is undesirable in terms of the convenience of the users and cost of development.

In view of this, U.S. patent application Ser. No. 228,594 filed on Aug. 5, 1988, and which issued on Apr. 30, 1991 as U.S. Pat. No. 5,012,352 has proposed an apparatus which is arranged to be capable of recording digital signals of different bit rates by making the number of video data recorded in each of recording tracks variable. In the case of this apparatus, the digital signal obtained by band-compressing the high-vision (high-definition) baseband signal and the digital signal of the MUSE signal before transmission can be processed by using the same mechanism and signal processing part.

The above-stated recording apparatus which is capable of recording digital signals of different bit rates by using one and the same apparatus is highly advantageous particularly in respect of its high universal applicability to digital signals of different kinds. However, in a case where a plurality of specific digital signals of different kinds are to be recorded, it still presents some problem that should be solved for facilitation of a data handling process. The following describes this problem by way of example through a digital VTR which is capable of recording digital video signals of two different kinds.

Generally, a digital VTR is arranged to divide video and audio signals into a given number of symbol units and to form a synchronizing block by adding to them an error correction code for correction of any code error occurring in a magnetic recording or reproducing system, identification data (hereinafter referred to as ID data) of varied kinds and synchronizing (hereinafter referred to as sync) data which consists of a given number of symbols provided for recomposing data at the time of reproduction. The video and audio signals are thus recorded on a magnetic tape with the sync block used as the unit of recording.

The sync block is generally arranged, for the purpose of facilitating data handling by the reproducing system, to include a number of symbols of video data in an integral ratio to a number of symbols corresponding to one scanning line amount of data of the video signal.

However, the bit rates of digital video signals of different kinds are seldom in an integral ratio to each other. Any attempt to have them in an integral ratio would impose some restriction on the form of digital signals. Such an attempt is, therefore, undesirable.

In a case where the digital video signals of two different kinds which have their bit rates not in an integral ratio but are to be recorded, the number of symbols of the sync block of one video signal which has a lower bit rate is adjusted to that of the other video signal which has a higher bit rate. In this instance, if the number of symbols of the sync block is set at a value corresponding to the number of symbols of one scanning line amount of the video signal having the higher bit rate, the start position of each line of the video signal having the lower bit rate becomes random in recording the signal. Such recording makes it difficult to recompose the video signal in the event of a special reproduction mode such as a high-speed search or the like.

Further, in cases where a digital signal obtained by band-compressing a high-vision baseband signal (hereinafter referred to as a baseband signal) and another digital signal obtained by digitizing a MUSE signal (hereinafter referred to as a digital MUSE signal) are to be recorded, the digital MUSE signal might be the video signal having a lower bit rate. In that event, there arise various problems.

More specifically, with the MUSE transmission signal which is as shown in FIG. 1 digitized and recorded as the video signal having a lower bit rate by a digital VTR which is capable of recording the baseband signal, the leading symbols of luminance and chrominance signals of each line would be allocated in a random state within the sync block recorded. Then, it is extremely troublesome to recompose by a reproducing system a line having the luminance and chrominance signals coexisting there. Further, the audio signal coexists with the chrominance signal in some line. Therefore, recomposition of the audio signal also requires an extremely complex process.

SUMMARY OF THE INVENTION

Such being the background, this invention is directed to the solution of the above-stated problems.

It is, therefore, an object of this invention to provide a recording apparatus which is of the kind recording a TV signal consisting of a given period amount of video signal and an audio signal corresponding to this given period with these signals in a time-division-multiplexed state and is arranged to effectively prevent the audio signal from being deteriorated by the adverse effect of drop-out, etc.

Under this object, a video signal recording apparatus according to this invention comprise input means for inputting a TV signal in which a given period amount of video signal and an audio signal corresponding to the given period amount of video signal are time-division-multiplexed with each other; separation means for separating the audio signal from the TV signal; recording signal forming means for forming a recording signal by dividing the given period amount of audio signal separated by the separation means into a plurality of audio data groups and by dispersively allocating the plurality of audio data groups into the video signal; and recording means for recording the recording signal while forming at least one track within the given period.

It is another object of the invention to provide a recording apparatus wherein a plurality of digital signals of different bit rates can be recorded by using a signal processing part and a mechanical part in common for the digital signals; data can be easily processed even in recording a plurality of specific digital signals; and data can be recomposed without difficulty particularly by the reproduction system thereof.

Under that object, a digital information signal transmitting apparatus arranged as an embodiment of this invention comprises input means for selectively inputting a first digital information signal or a second digital information signal which is of a bit rate lower than that of the first digital information signal; transmitting signal forming means for forming a transmitting signal including a great number of synchronizing blocks each of which is composed of a predetermined number of symbols including symbols corresponding to the information signal input by the input means and synchronizing symbols, the synchronizing block being arranged to include other symbols the number of which corresponds to a difference in bit rate between the first and second digital information signals when the input means is inputting the second digital information signal; and transmission means for transmitting the transmitting signal to a transmission line.

It is a further object of the invention to provide an encoding device which encodes a TV signal consisting of a given period amount of video signal and the given period amount of audio signal with the video and audio signals time-division-multiplexed and is arranged to permit simplification of circuit arrangement and to be capable of compressing the amount of data.

Under this object, a video signal coding apparatus according to this invention comprises input means for inputting a TV signal in which a video signal and an audio signal corresponding to the video signal are time-division-multiplexed with each other; and coding means for compressing the band of the TV signal by coding the TV signal, the coding means being arranged to perform a coding action both on the video and audio signals by using one and the same coding circuit.

The above and other objects and features of the invention will become apparent from the following detailed description of embodiments thereof taken in connection with the accompanying drawings.

DETAILED DESCRIPTION OF THE PREFERRED EMBODIMENTS

The following describes by way of example a digital VTR which is arranged as an embodiment of this invention to be capable of recording both a baseband signal and a digital MUSE signal.

Figure 1:
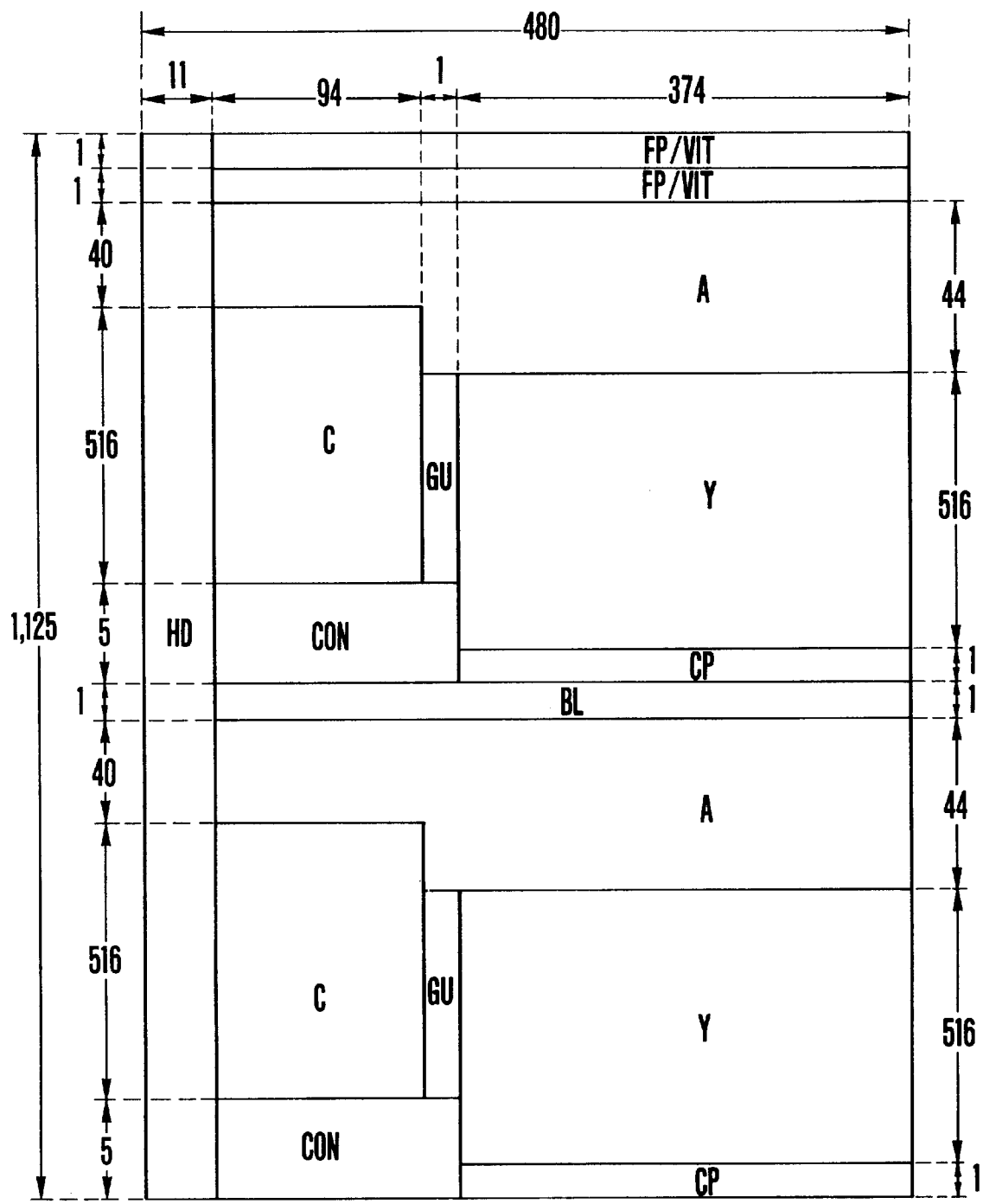
FIG. 1 shows one frame amount of transmitting signal of a digital MUSE signal.
Figure 2:
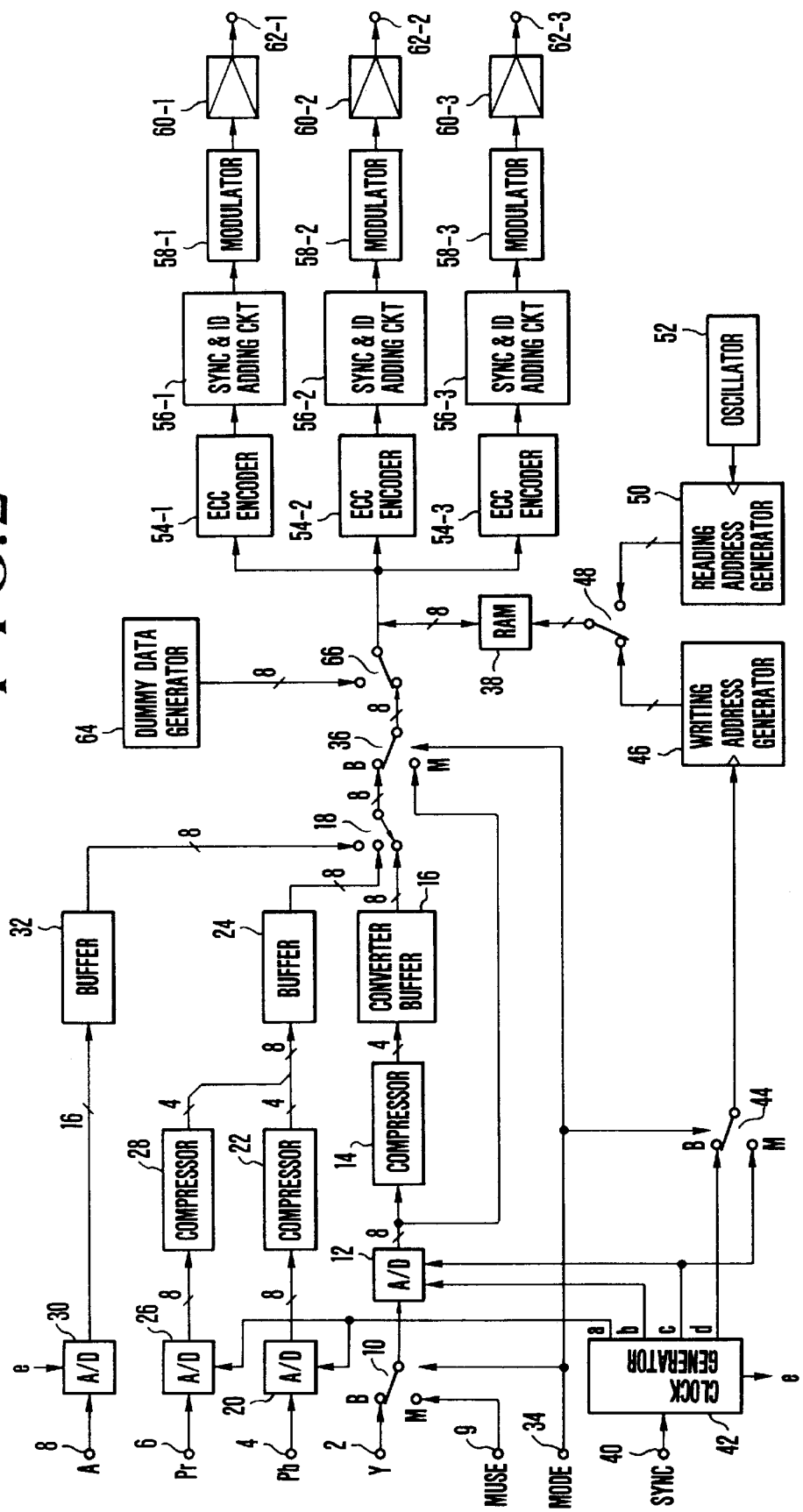
FIG. 2 is a block diagram showing the arrangement of a recording system of a digital VTR arranged as an embodiment of this invention.

FIG. 2 is a block diagram showing the arrangement of a digital VTR arranged as the embodiment of this invention. Referring to FIG. 2, a terminal 2 is arranged to input the luminance signal Y of a baseband signal. Terminals 4 and 6 are arranged to input a color-difference signal Pb and a color-difference signal Pr respectively. A terminal 8 is arranged to input an audio signal which comes along with the baseband signal. A terminal 9 is arranged to input a MUSE signal.

Recording a Baseband Signal

The baseband signal is recorded in the following manner.

A terminal 34 receives a mode signal MODE which designates either a baseband signal recording mode or a MUSE signal recording mode. In recording the baseband signal, the signal MODE causes switches 10 and 36 to have their connecting positions at their terminals B. Then, the luminance signal Y is allowed to be supplied via the switch 10 to an analog-to-digital (A/D) converter 12. The signal Y is converted by the A/D converter 12 into a digital signal of eight bits.

Assuming that the sampling frequency fs of the A/D converter 12 is 44.55 MHz, the number of effective picture elements per line is 1,152. The bit rate then becomes 356.4 Mbps. Such a high bit rate does not allow the VTR to perform recording over a long period of time. Besides, the data processing speed of the VTR becomes too fast. Therefore, the digital luminance signal output from the A/D converter 12 is supplied to a band compressor 14 to have its frequency band compressed there. A sub-sampling circuit or a known high-efficiency encoding circuit or the like is usable as the band compressor 14. In the case of this embodiment, the number of picture elements is reduced to ½ by sub-sampling. Further, the 8-bit signal is reduced to a 4-bit signal by a differential pulse code modulation (hereinafter referred to as DPCM). The amount of information is thus reduced to ¼.

The luminance signal data which is band-compressed by the compressor 14 is supplied to a memory circuit 16 which functions as a bit converter and a buffer. The memory circuit 16 then performs a process of converting two 4-bit data into one 8-bit data and also performs a timing adjustment process on a chrominance signal and an audio signal to adjust them to each other as will be described later. As a result, the luminance signal output from the circuit 16 has 288 symbols per line.

Meanwhile, the color-difference signals Pb and Pr coming to the terminals 4 and 6 are supplied respectively to A/D converters 20 and 26. Each of them is converted into an 8-bit digital signal at a sampling frequency of 22.275 MHz. The digital signals thus obtained are supplied to band compressors 22 and 28 to be band-compressed in the same manner as in the case of the luminance signal. Each of the band compressors 22 and 28 is assumed to reduce the number of picture elements to ½ by sub-sampling and further convert the 8-bit signal into a 4-bit signal by the DPCM method. Then, 8-bit data which is thus obtained by combining two 4-bit color-difference signals Pb and Pr has 288 symbols per line, whose number is equal to that of the luminance signal.

The audio signal which comes through the terminal 8 is supplied to an A/D converter 30. The converter 30 samples the audio signal at a frequency of 51.84 KHz and converts it into 16-bit data. The 16-bit data is then converted into 8-bit data by a buffer 32. As a result, audio data having 3456 symbols per frame is obtained.

Sampling clock signals supplied to the A/D converters 12, 20, 26 and 30 are obtained from a clock generator 42, which is formed with a PLL (phaselocked loop) and is arranged to receive a sync signal SYNC 40 separated from the analog high-vision signal. These clock signals include a clock signal "a" which is of a frequency 22.275 MHz, a clock signal "b" which is of a frequency 44.55 MHz and a clock signal "e" which is of a frequency 51.84 KHz.

The digital data including the luminance signal, the chrominance signal and the audio signal as mentioned in the foregoing is recorded according to a format which will be described below with reference to FIGS. 3 and 4.

Figure 3:
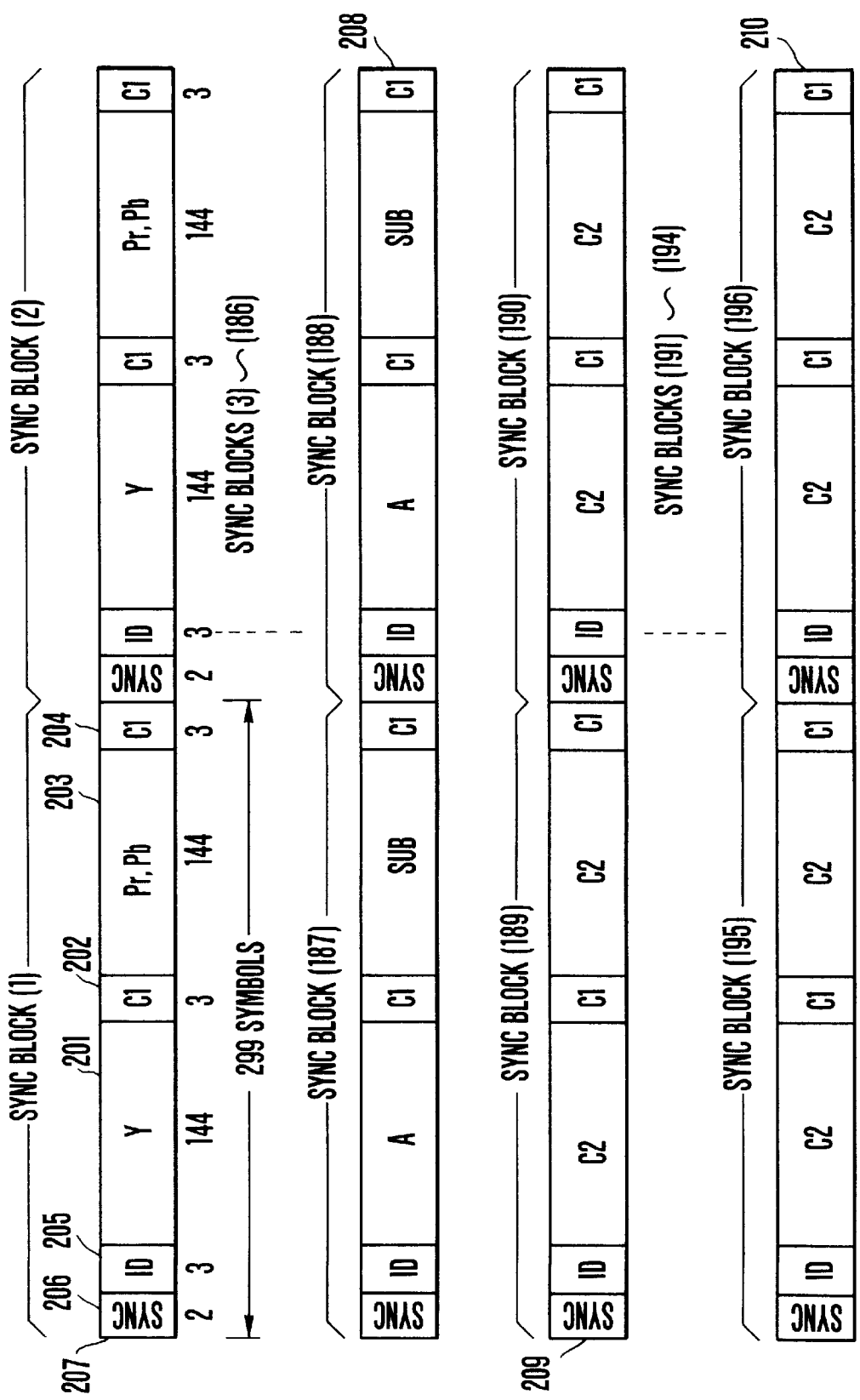
FIG. 3 shows a data format employed in recording a baseband signal with the recording system shown in FIG. 2.

FIG. 3 shows one track amount of data arranged by the digital VTR according to this invention. In FIG. 3, a reference symbol Y 201 denotes the symbols of the luminance signal. A symbol Pr, Pb 203 denotes the symbols of the color-difference signals. A symbol A denotes the symbols of the audio signal. As shown, C1 parity codes 202 and 204 each of which is composed of three symbols are respectively added to 144 compressed luminance signal symbols and 144 compressed color-difference signal symbols corresponding to ½ line. Further, three symbols 205 of ID data and two symbols 206 of the sync data SYNC are added. By this, one sync block 207 is formed.

The VTR of this embodiment is arranged to record one frame amount of information in 12 tracks by dividing the information, with the VTR assumed to operate in the following manner. A recording tape is wrapped at least 180 degrees around a rotary head cylinder. The signal of each channel is recorded alternately by two heads. The rotary head cylinder is arranged to rotate at a speed of 3600 r.p.m., with a total of three channels provided.

In accordance with the BTA studio standards, the number of effective lines per frame is 1035. However, since one frame amount of information obtained by the above-stated process is to be recorded in 12 tracks, the number of effective lines is arranged to be 1044 (87×12 lines) and, in addition to this, a total of 84 lines are provided for the audio signal, a sub-code signal, etc. The number of information signal lines thus becomes 1128 (94×12 lines). The number of sync blocks per track is 188 including sync blocks (1) to (188) as shown in FIG. 3. Further, since the above-stated audio signal has 288 symbols per track, the above-stated data format permits audio signal recording in up to seven channels.

Further, in the data matrix of each track shown in FIG. 3, a total of four C2 parity codes are added in the vertical direction. In other words, data located in the same position in each of the even- and odd-number sync blocks are extracted and four parity codes are added thereto. As a result, a sync block consisting of only a total of eight error correction codes is added to the data of each track.

Figure 4:
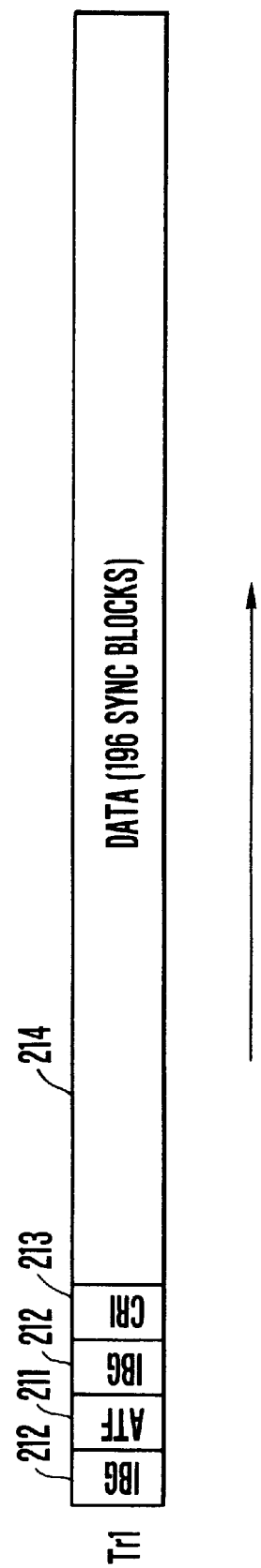
FIG. 4 shows the recording format on a tape of the recording system.

FIG. 4 shows the recording format of a track to be actually formed on the tape by the VTR of this embodiment. The track includes an area (ATF) 211 in which a tracking control pilot signal is recorded for the data recording area 214 according to the data matrix of FIG. 3; a clock area (CRI) 213; and gap spaces (IBG) 212. The size of each of these areas corresponds to a recording area required for recording one sync block amount of data. The total of them thus corresponds to an area for four sync blocks.

In recording on a ½ inch tape in accordance with the above-stated format, the shortest recording wave length of the VTR of this embodiment is about 0.53 µm, which is easily attainable.

Again referring to FIG. 2, a switch 18 is a data selector which is arranged to selectively output the above-stated luminance signal, the color-difference signals and the audio signal. These signals are output from buffers 16, 24 and 32 at such a timing that they never overlap each other. A data selector 36 is arranged to output the outputs of the switch or selector 18 and to write them via a selector 66 into a RAM (random-access memory) 38. Then, the writing address of the RAM 38 is determined by a writing address generator 46 which is arranged to receive via a switch 44 a clock signal "d" of a frequency which is an integer times as high as 44.55 MHz.

Figure 6:
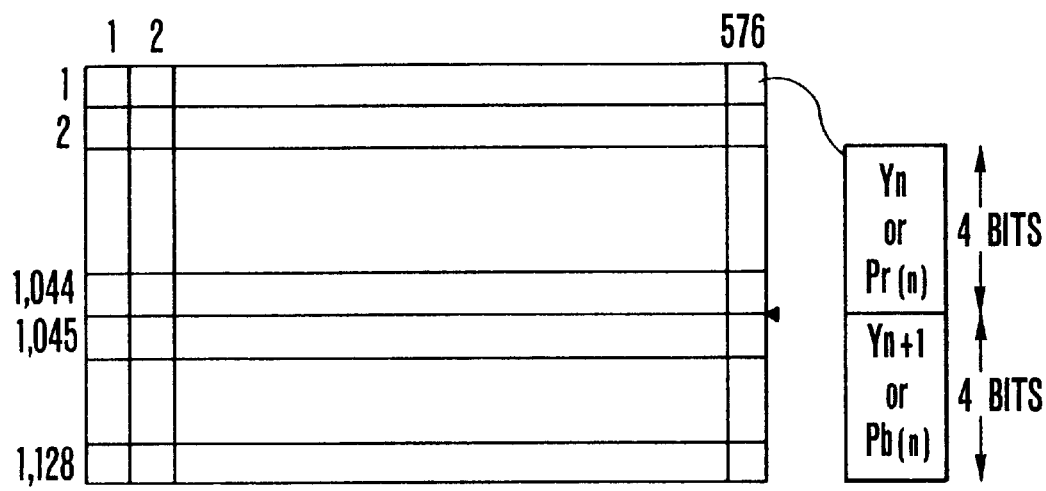
FIG. 6 shows allocation of data of the baseband signal on a RAM of the recording system of FIG. 2.

FIG. 6 shows the allocation of the baseband signal stored in the RAM 38. In FIG. 6, reference numerals 1 to 576 denote horizontal addresses which correspond to the number of symbols in the horizontal direction. Numerals 1 to 1128 denote vertical addresses which correspond to the number of lines. The RAM 38 has a capacity of eight bit per address. More specifically, each address corresponds to two picture element amounts of the luminance signal and to two picture element amounts of the two different kinds of color-difference signals, putting them together. Further, the video signal is recorded within a part including the vertical addresses 1 to 1044. The audio signal and the sub-codes are recorded within a part including the vertical addresses 1045 to 1128.

The reading from the RAM 38 is performed in the following manner. A data selector 48 selects the output of a reading address generator 50 at a reading timing. The reading address generator 50 is arranged to operate according to a clock signal of a given frequency which corresponds to the recording bit rate and is output from an oscillator 52. According to this, a three-track amount of data is read out from the RAM 38 at every half turn of the rotary head cylinder. The data read out is distributed to ECC (error correction code) encoders 54-1, 54-2 and 54-3 of three channels. The outputs of the ECC encoders 54-1, 54-2 and 54-3 are supplied to sync and ID data adding circuits 56-1, 56-2 and 56-3 to have the above-stated sync data and the ID data added thereto. The outputs of these circuits are then modulated by modulators 58-1, 58-2 and 58-3. The modulated signals of the three channels are amplified up to a given level by recording amplifiers 60-1, 60-2 and 60-3. The signals amplified are supplied to terminals 62-1, 62-2 and 62-3 which in turn supply the amplified signals to the three channels of a recording system (not shown) to be recorded on a magnetic tape.

Recording a MUSE Signal

Next, a recording operation on the MUSE signal is described as follows.

In the MUSE signal recording mode, the mode signal MODE causes the switches 10 and 44 and the data selector 36 to output signals from their sides M. The MUSE signal which is received at the terminal 9 is supplied to the A/D converter 12. Before transmission, the MUSE signal is sampled at a frequency of 16.2 MHz and converted into a digital signal of eight bits. In the case of the VTR of this embodiment, the MUSE signal is converted into an 8-bit digital form according to a clock signal "c" of 16.2 MHz. By this, a digital MUSE signal of 480 symbols per line is obtained.

The digital MUSE signal is supplied to the RAM 38 via data selectors 36 and 66. In this instance, the MUSE signal sampling clock signal "c" is supplied to the writing address generator 46.

Figure 7:
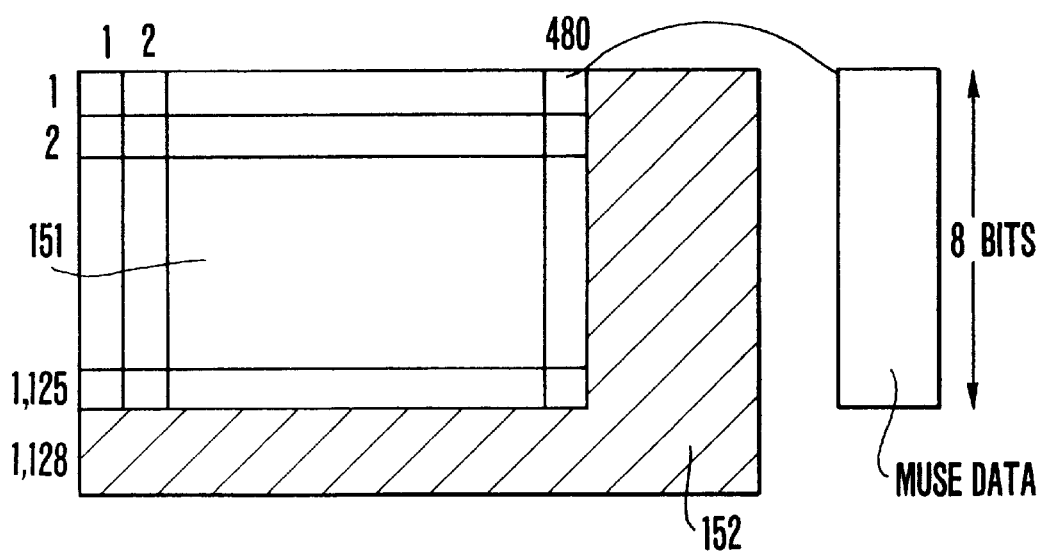
FIG. 7 shows allocation of data of the digital MUSE signal on the RAM of the recording system of FIG. 2.

FIG. 7 shows the allocation of the MUSE signal within the RAM 38. The MUSE signal is stored according to the clock signal "c" in a part including vertical addresses 1 to 1125 and horizontal addresses 1 to 480. Meanwhile, dummy data which is output from a dummy data generator 64 is stored via the data selector 66 in a hatched part 152 including remaining addresses. The data thus stored is read out from the RAM 38 and processed in exactly the same manner as in the case of recording the baseband signal. Therefore, description of it is omitted here.

Figure 5:
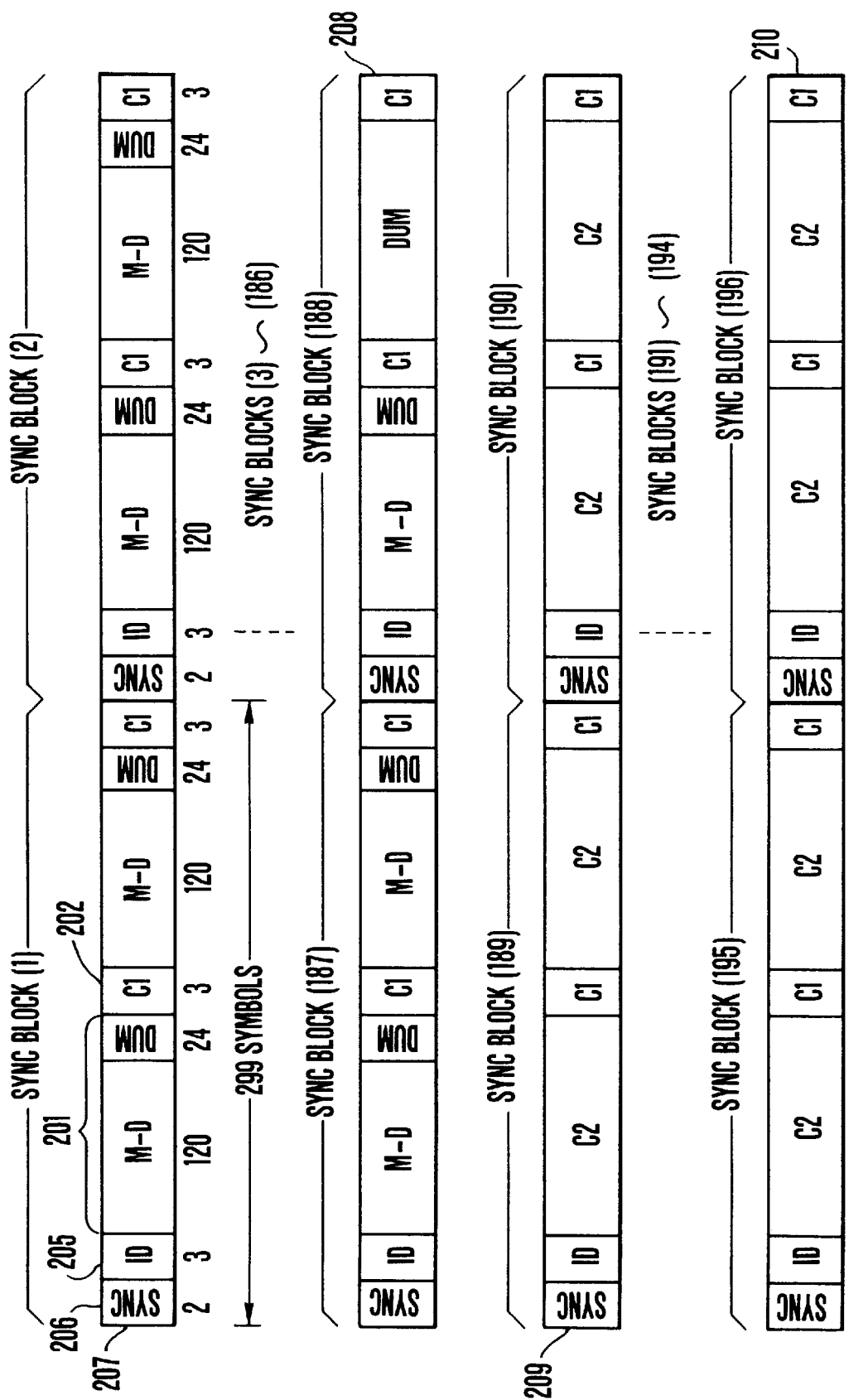
FIG. 5 shows a data format employed in recording a digital MUSE signal with the recording system of FIG. 2.

FIG. 5 shows the data arrangement of one track amount of the digital MUSE signal to be recorded in the above-stated manner. In FIG. 5, a reference symbol M-D denotes the symbols of the digital MUSE signal; and DUM the symbols of the dummy data. As shown, two sets of 144 symbols are prepared by adding 24 symbols of the dummy data to 120 symbols of the digital MUSE signals. Three symbols of a C1 parity code are added to each of these sets. Further, three symbols of ID data and two symbols of sync data are also added to obtain one sync block.

As a result, a sync block (188) includes the first 120 symbols of the digital MUSE signal and the dummy data as the remaining data, because the digital MUSE signal consists of 1125 lines per frame. One line is correlated to two sync blocks. The number of sync blocks of the digital MUSE signal per track thus becomes 187.5 (1125×2/12). Like in the case of recording the baseband signal, the C2 parity codes are provided for the sync blocks (189) to (196).

Further, the recording pattern of the MUSE signal actually obtained on the tape is similar to the pattern shown in FIG. 4 which is obtained in recording the baseband signal.

Reproduction

The reproducing operation of this embodiment is performed as described below.

Figure 8:
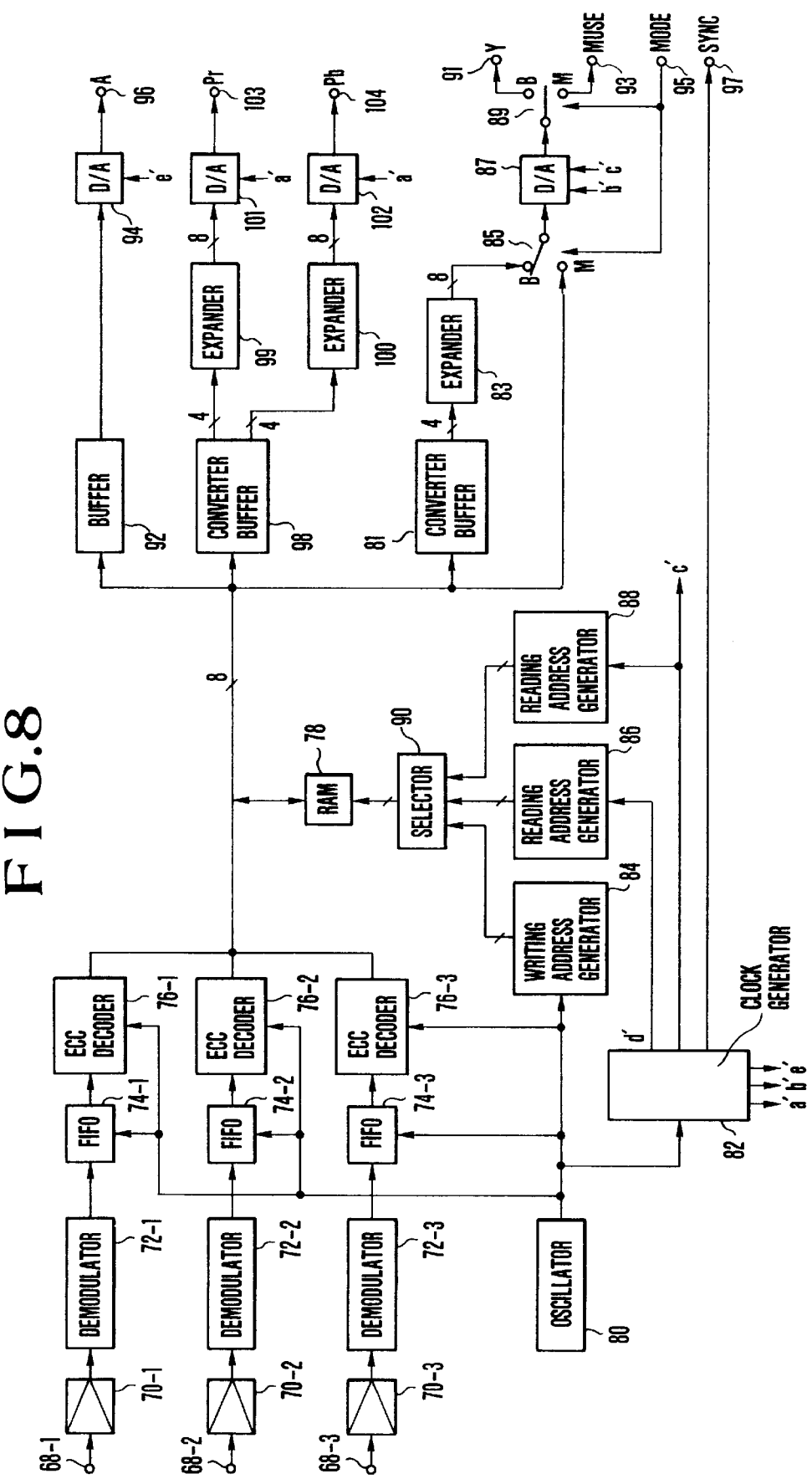
FIG. 8 is a block diagram showing the arrangement of the reproducing system of the digital VTR of FIG. 2.

FIG. 8 shows the arrangement of the reproducing system of the VTR of this embodiment. Referring to FIG. 8, terminals 68-1, 68-2 and 68-3 are arranged to input the signals of the above-stated three channels after they are reproduced by a reproducing part which is not shown. The reproduced signals of the three channels are amplified by reproduction amplifiers 70-1, 70-2 and 70-3 up to a given level. The amplified signals are digital-demodulated by demodulators 72-1, 72-2 and 72-3. This process is accomplished according to a clock signal formed by a PLL (not shown) in synchronism with a clock signal component having jitters included in the reproduced signals. The clock generator 82 also is arranged to generate a sync signal SYNC 97.

The signals of three channels are written into first-in/first-out (FIFO) memories 74-1, 74-2 and 74-3 in synchronism with the clock signal which includes jitters. These signals are read out from these memories in accordance with a clock signal of a given stable frequency and are thus made into digital signals having no jitters. The digital signals read out from the FIFO memories 74-1, 74-2 and 74-3 are supplied to ECC decoders 76-1, 76-2 and 76-3 to correct any code errors which occurred in the magnetic recording and reproducing systems. The corrected digital signals are written into a RAM 78.

The writing address of the RAM 78 is determined by a writing address generator 84 in synchronism with a clock signal output from an oscillator 80 and with reference to ID data included in the reproduced signals. At the data writing timing, a data selector 90 supplies address data output from the writing address generator 84 to the RAM 78. The processes performed up to this point of the reproducing operation as described above are the same both for the recording of the baseband signal and that of the digital MUSE signal. Then, the recorded signal data is written into the RAM 78 in a manner as shown in FIG. 6 if the recorded signal is the baseband signal or in a manner as shown in FIG. 7 if the recorded signal is the MUSE signal.

A reading address generator 86 generates a reading address in accordance with a clock signal "d'" which is generated from a clock signal generator 82 and is of the same frequency as the clock signal "d" used by the recording system. In a case where the recorded signal is the baseband signal, a mode signal MODE which is supplied through a terminal 95 causes a selector 90 to supply the address data from the address generator 86 to the RAM 78. This causes the luminance signal, the color-difference signals and the audio signal of the baseband signal to be output in a time-sharing manner.

A buffer 81 which has a bit converting function is arranged to output the luminance signal consisting of two DPCM (differential pulse code modulation) codes at a given rate in the form of a DPCM code of four bits. The digital signal which is thus output from the buffer 81 is supplied to a band expander 83 to be processed including DPCM decoding and interpolating processes, etc. The digital signal is thus brought back into the original digital luminance signal of 44.55 MHz. Then, a digital-to-analog (D/A) converter 87 operates according to a clock signal "b'" of 44.55 MHz output from the clock signal generator 82 to convert the digital luminance signal into an analog signal. The analog luminance signal thus obtained is output from an output terminal 91 via one side B of a switch 89.

A buffer 98 also has a converting function and is arranged to receive the above-stated two different color difference signals; to convert them into the 4-bit DPCM code of the color-difference signal Pr and the 4-bit DPCM code of the color-difference signal Pb; and to supply them at a given rate respectively to band expanders 99 and 100. The band expanders 99 and 100 bring these inputs into original 8-bit color-difference signals Pr and Pb. These signals Pr and Pb are further subjected to interpolation processes and are thus made into digital signals of 22.275 MHz respectively. The digital signals thus obtained are supplied to D/A converters 101 and 102. The D/A converters 101 and 102 operate according to a clock signal "a'" output from the clock signal generator 82 to convert the inputs into analog color-difference signals Pr and Pb. The analog signals Pr and Pb are output from output terminals 103 and 104 respectively.

A buffer 92 is arranged to receive the above-stated audio signal and to output it at a given data rate. The output of the buffer 92 is supplied to a D/A converter 94, which operates according to a clock signal "e'" of 51.84 KHz to bring the audio signal into the original analog audio signal. The analog audio signal is output from an output terminal 96.

Meanwhile, a reading address generator 88 is arranged to generate a reading address in accordance with a clock signal "c'" which is generated by the clock signal generator 82 at the same frequency as the clock signal "c" used by the recording system. In a case where the recorded signal is the digital MUSE signal, the address data output from the address generator 88 is supplied via the selector 90 to the RAM 78. As a result, the above-stated digital MUSE signal is output at a given rate from the RAM 78. At this time, the mode signal MODE causes the data selector 85 to output data from its one side M. The digital MUSE signal is, therefore, supplied to the D/A converter 87. The D/A converter 87 operates according to the clock signal "c'" to convert the digital MUSE signal into the original analog MUSE signal. The analog MUSE signal is then output via one side M of the switch 89 from an output terminal 93.

The digital VTR which is arranged as described in the foregoing is not only capable of processing the baseband signal and the digital MUSE signal by using the signal processing part and a related mechanical part in common for them but also capable of recording and reproducing the digital MUSE signal without changing its data format at all. Therefore, at the time of reproduction, the MUSE signal can be recomposed very easily without necessitating a complex data allocation converting process which is generally required for the apparatus of the kind adapted for processing the above-stated different signals. The MUSE signal thus can be easily recomposed even in the event of special reproduction such as a high speed search.

While the embodiment described is arranged to record dummy data along with the digital MUSE signal in recording the digital MUSE signal, the dummy data may be replaced with some other information. Such information includes, for example, sub-codes of varied kinds.

In accordance with the arrangement described in the foregoing, a number of other symbols corresponding to a difference in bit rate and the symbols related to the second digital signal is disposed within the same sync block. With the number of other symbols suitably set, therefore, any digital signal can be recorded. Further, with respect to the symbols related to the second digital signal, they can be arranged within each sync block in a state corresponding to the original format of the digital signal. This enables the reproducing system of the VTR to easily recompose the data.

Figure 9:
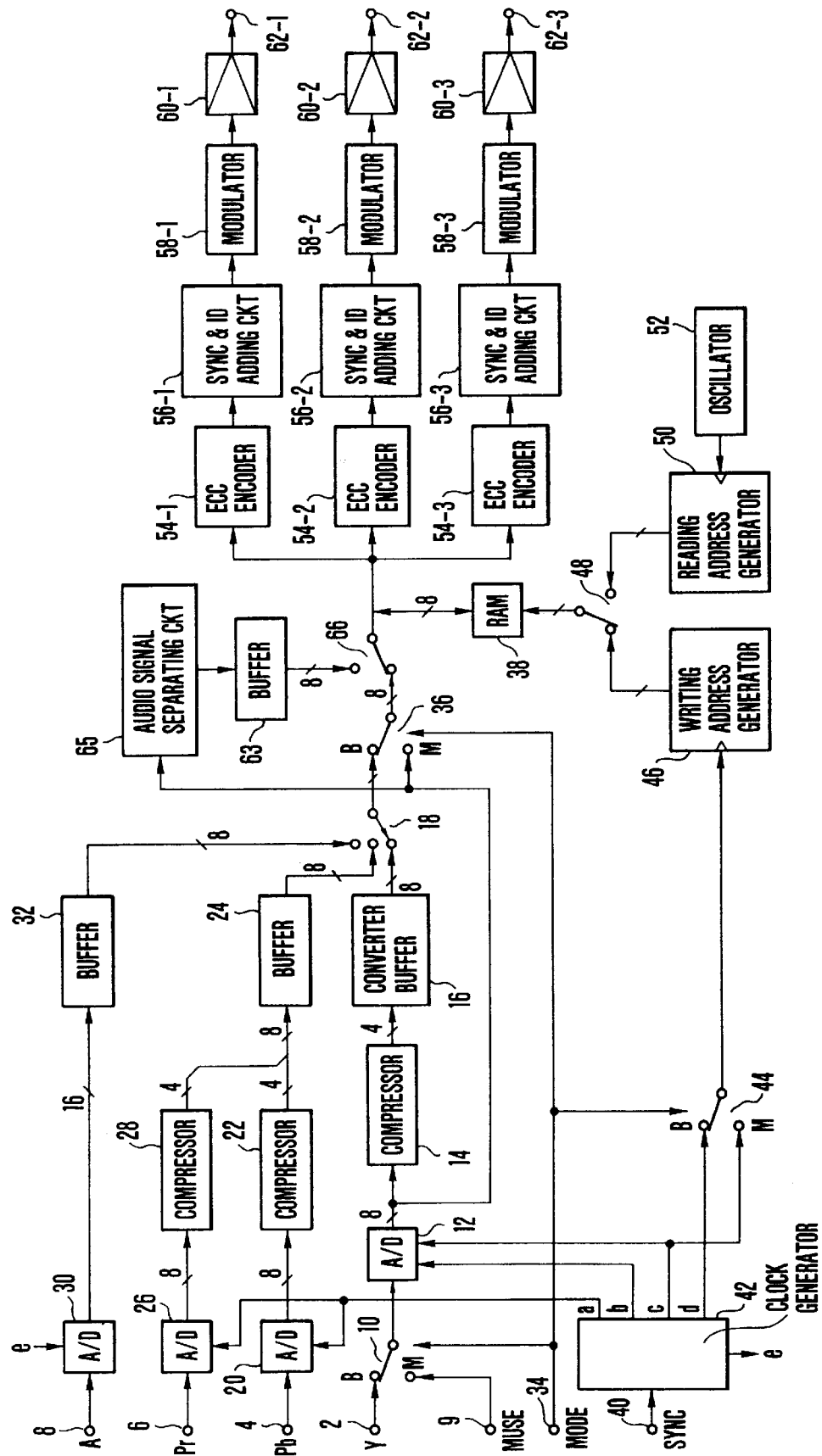
FIG. 9 is a block diagram showing the arrangement of the recording system of a digital VTR arranged as another embodiment of the invention.

Another embodiment is described as follows:

FIG. 9 shows the arrangement of the recording system of a digital VTR which is arranged according to this invention as a second embodiment thereof. In FIG. 9, the same component parts as those of FIG. 2 are indicated by the same reference numerals. The VTR of the second embodiment records the MUSE signal in a manner which differs a little from the recording method employed by the digital VTR of the first embodiment described in the foregoing with reference to FIGS. 2 to 8. The following describes only this difference.

In recording the MUSE signal, the MUSE transmitting signal which is received via the terminal M of a switch 10 is converted into an 8-bit digital signal by an A/D converter 12 according to a clock signal of 16.2 MHz. The digital MUSE signal thus obtained is supplied to an audio signal separating circuit 65 to separate and demodulate only the audio signal included in the MUSE signal. The details of this audio signal separating and demodulating process are as disclosed in "High Vision Technique", Chap. 3, Para. 3.2, issued Nov. 25, 1988, compiled by NHK Broadcasting Technical Research Center. The details of this process are therefore omitted from the following description.

The digital MUSE signal is supplied as it is via data selectors 36 and 66. Further, the audio signal separated from the MUSE signal (hereinafter referred to as the separated audio signal) is also supplied to the RAM 38 via a buffer 63 and the selector 66. At this time, a MUSE signal sampling clock signal "c" is supplied to a writing address generator 46. The allocation of the MUSE signal within the RAM 38 is as shown in FIG. 7. However, in this case, the separated audio signal is stored at the address 152 at which the MUSE signal is not stored.

The data reading from the RAM 38 and the ensuing processes are performed in exactly the same manner as in the case of the recording operation of the first embodiment and, therefore, require no further description.

Figure 10:
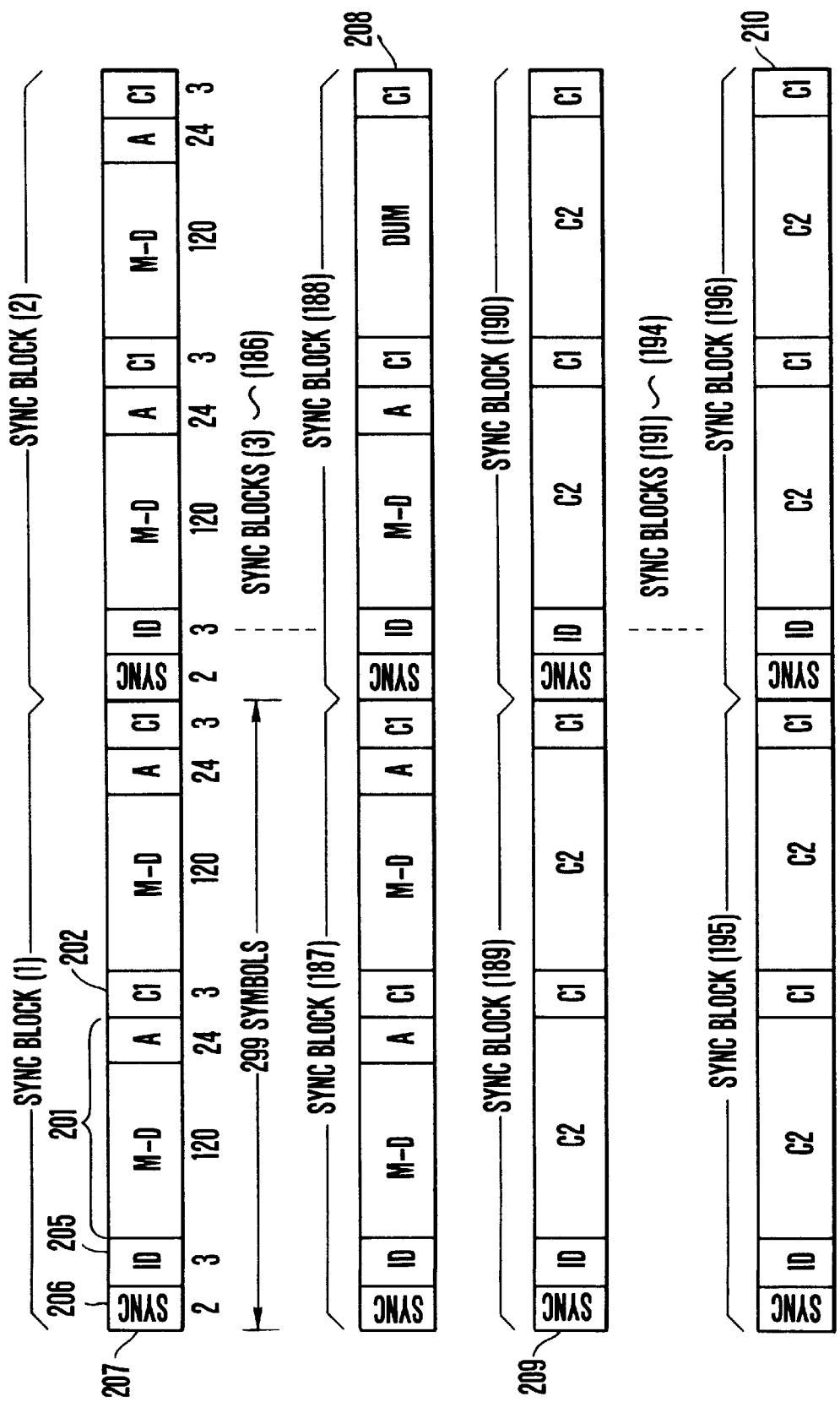
FIG. 10 shows a data format employed in recording a digital MUSE signal with the recording system of FIG. 9.

The arrangement of one track amount of data of the digital MUSE signal and that of the separated audio signal is as shown in FIG. 10. In FIG. 10, a reference symbol M-D denotes the symbols of the digital MUSE signal. A reference symbol A denotes those of the above-stated separated audio signal. Two sets of symbols are prepared, each set consisting of 144 symbols with 24 symbols of the separated audio signal data added to 120 symbols of the digital MUSE signal. A C1 parity code which consists of three symbols is added to each of the two sets. Further ID data consisting of three symbols and sync data of two symbols are also added to obtain a sync block.

In the sync block (188), the first 144 symbols are for the digital MUSE signal and the separated audio signal. The remaining data of the sync block (188) is dummy data.

The reproducing operation of the second embodiment is described as follows.

Figure 11:
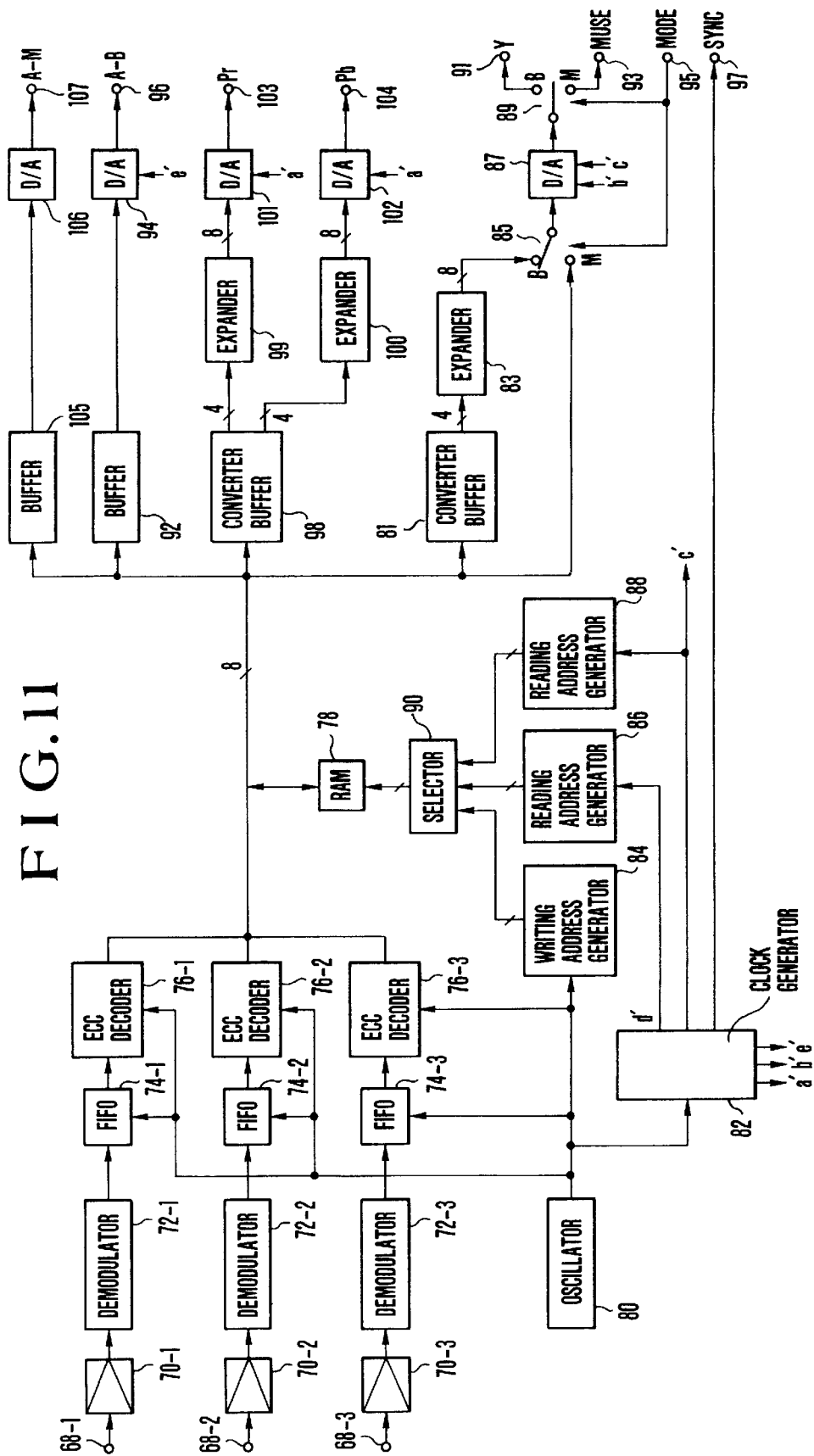
FIG. 11 is a block diagram showing the arrangement of the reproducing system of the digital VTR of FIG. 9.

FIG. 11 shows the arrangement of the reproducing system of the digital VTR of FIG. 9. In FIG. 11, the same component parts as those of FIG. 8 are indicated by the same reference numerals. The following description is limited to a difference of the reproducing system of the second embodiment from that of the first embodiment which is shown in FIG. 8.

In a case where the recorded signal is a digital MUSE signal, a D/A converter 87 operates according to a clock signal "c'". Then, the original analog MUSE signal is eventually output via the terminal M of a switch 89 from an output terminal 93. A buffer 105 receives the separated audio signal and outputs it at a given data rate. The output of the buffer 105 is converted into an analog audio signal by a D/A converter 106 before it is output from an output terminal 107.

The digital VTR which is arranged as described above records and reproduces the MUSE signal without changing the data format thereof at all. Therefore, at the time of reproduction, the MUSE signal can be very easily recomposed. As for the audio signal, the separated audio signal which is separated from the MUSE signal is dispersively recorded in the sync blocks. Therefore, the audio signal is never excessively deteriorated at the time of reproduction even in the event of a drop-out, etc.

The second embodiment is arranged to record the data of the digital MUSE signal by allocating all the data on the same data matrix as the baseband signal. However, this arrangement may be changed, for example, to record on the same data matrix only the lines containing the video information included in the MUSE signal.

Next, a third embodiment of this invention is described as follows.

Figure 12:
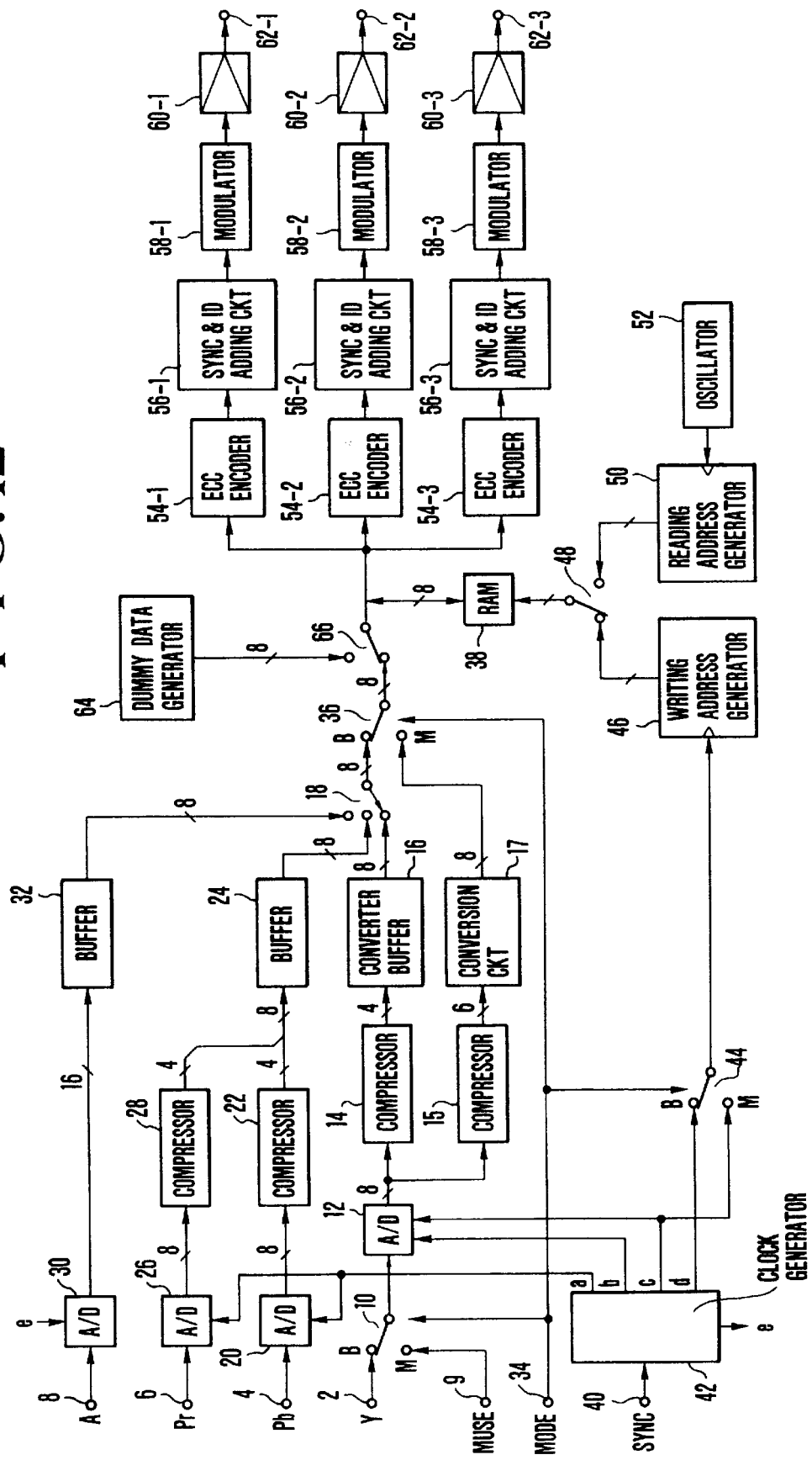
FIG. 12 is a block diagram showing the arrangement of the recording system of a digital VTR arranged as a further embodiment of the invention.

FIG. 12 shows the recording system of a digital VTR which is arranged as the third embodiment of this invention. In FIG. 12, the same component parts as those of FIG. 2 are indicated by the same reference numerals. The following description covers only a point in which the third embodiment differs from the first embodiment which is shown in FIG. 2.

In the case of the third embodiment, the MUSE signal is compressed after it is digitized. This operation is as follows: an 8-bit digital MUSE signal which is obtained from an A/D converter 12 is supplied to a band compressor 15 to be converted into 6-bit parallel data through a DPCM process. As mentioned in the foregoing, the audio signal included in the MUSE signal is originally in the form of analog three-valued signal. In this instance, therefore, the conversion of it from the 8-bit signal into the 6-bit signal by the DPCM process does not cause any deterioration of information at all. The digital MUSE signal thus obtained has 360 symbols per line. The 6-bit digital signal is supplied to a conversion circuit 17. The conversion circuit 17 then converts it into 8-bit parallel data by converting four symbols of six bits into three symbols of eight bits. The output of the conversion circuit 17 is supplied to the terminal M of a data selector 36.

Since the MUSE signal is compressed to ¾ of it in this manner, the recording data rate of the baseband signal is also lowered in the case of this embodiment. The sampling frequency fs of the A/D converter 12 is set at 29.7 MHz. As a result, the number of effective picture elements per line becomes 768 while the bit rate becomes 238.6 Mbps.

Figure 13:
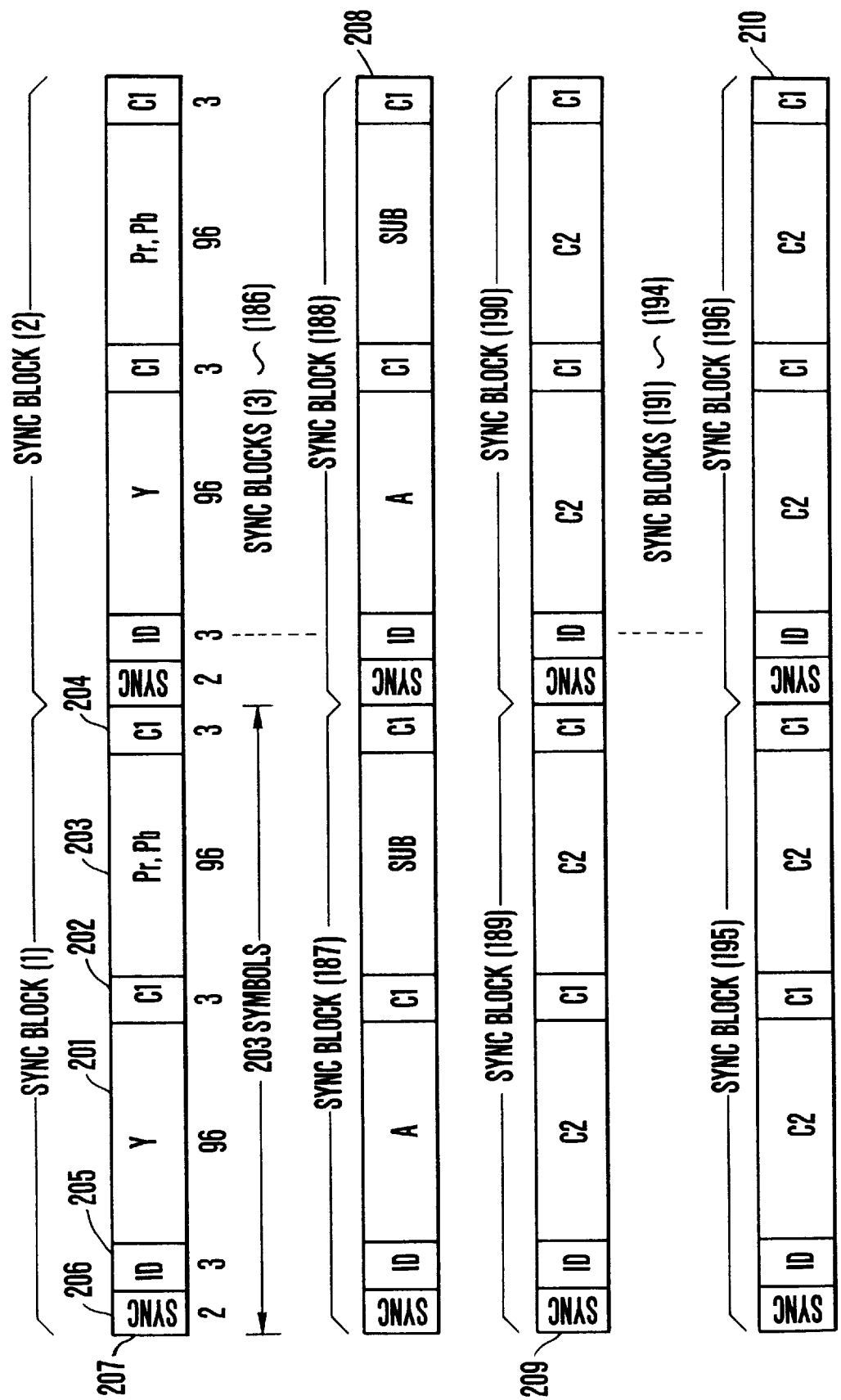
FIG. 13 shows a data format employed in recording a baseband signal with the recording system of FIG. 12.

FIG. 13 shows the data arrangement of one track amount of the baseband signal to be processed by the digital VTR of the third embodiment. As shown, three symbols of the C1 parity code are added respectively to 96 symbols of ½ line amount of the luminance signal compressed and to 96 symbols of the color-difference signals compressed. Further, three symbols 205 of ID data and two symbols 206 of sync data SYNC are also added to form one sync block 207 with a total of 203 symbols.

Figure 14:
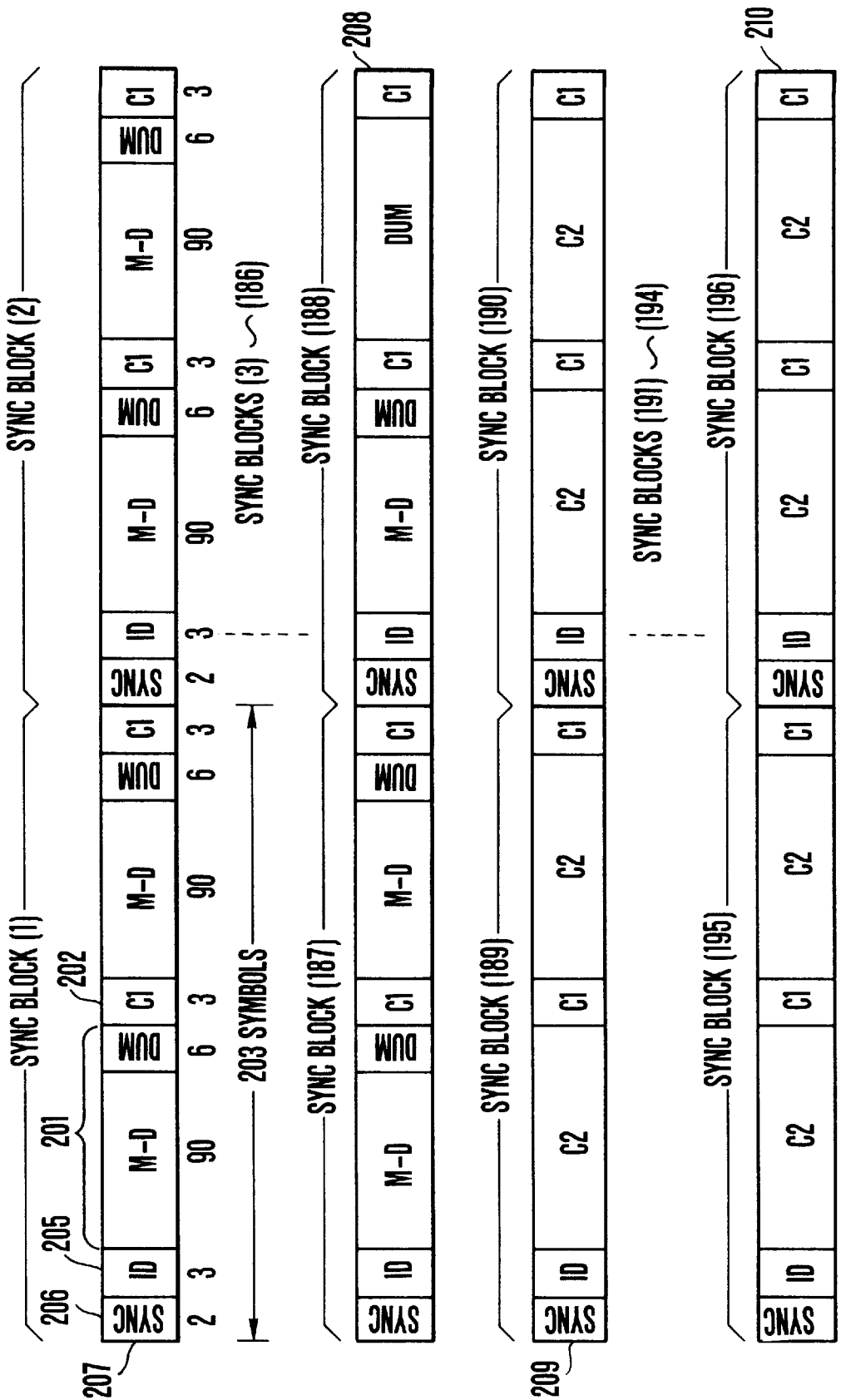
FIG. 14 shows a data format employed in recording a digital MUSE signal with the recording system of FIG. 12.

FIG. 14 shows the data arrangement of one track amount of the digital MUSE signal to be recorded by the digital VTR of the third embodiment. In FIG. 14, a reference symbol M-D denotes the symbols of the digital MUSE signal. As shown, two sets of 96 symbols are prepared. Each of these sets is obtained by adding 6 symbols of dummy data to 90 symbols of the digital MUSE signal. Three symbols of ID data and two symbols of sync data are further added to form one sync block.

Figure 15:
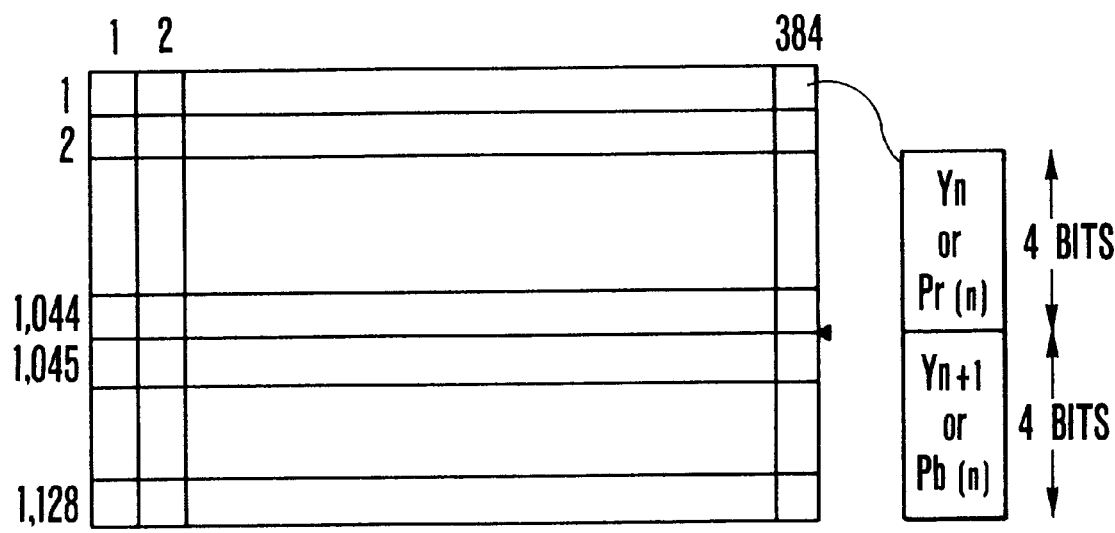
FIG. 15 shows the allocation of data of the baseband signal on the RAM of the recording system of FIG. 12.
Figure 16:
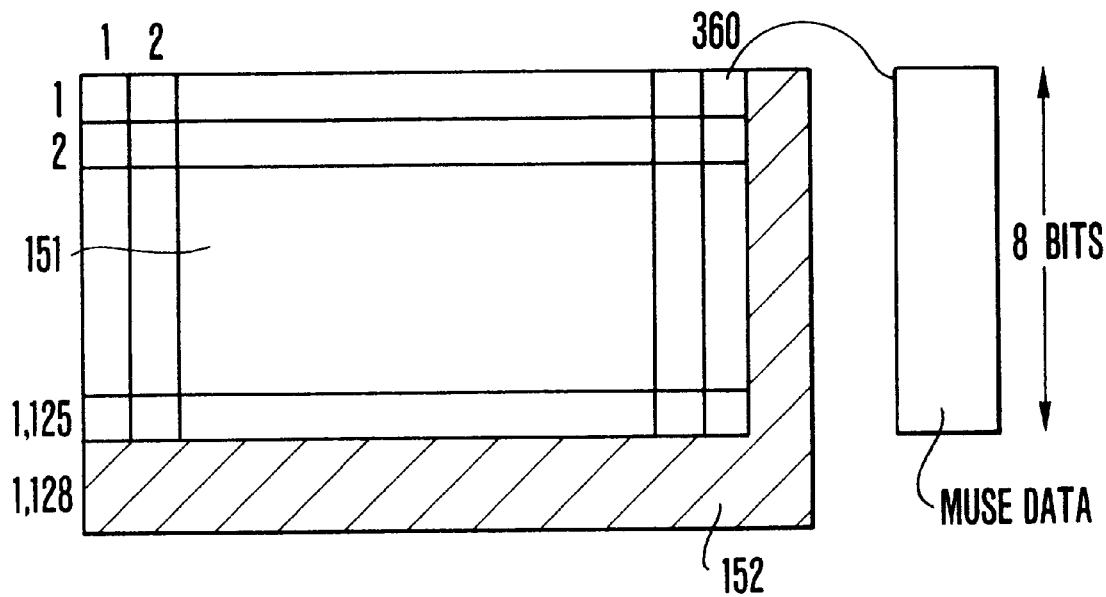
FIG. 16 shows allocation of data of the digital MUSE signal on the RAM of the recording system of FIG. 12.

FIG. 15 shows the allocation of the baseband signal within the RAM 38. FIG. 16 shows the allocation of the MUSE signal within the RAM 38. As shown, the MUSE signal is stored according to the above-stated clock signal "c" within a part consisting of vertical addresses 1 to 1,125 and horizontal addresses 1 to 360.

Figure 17:
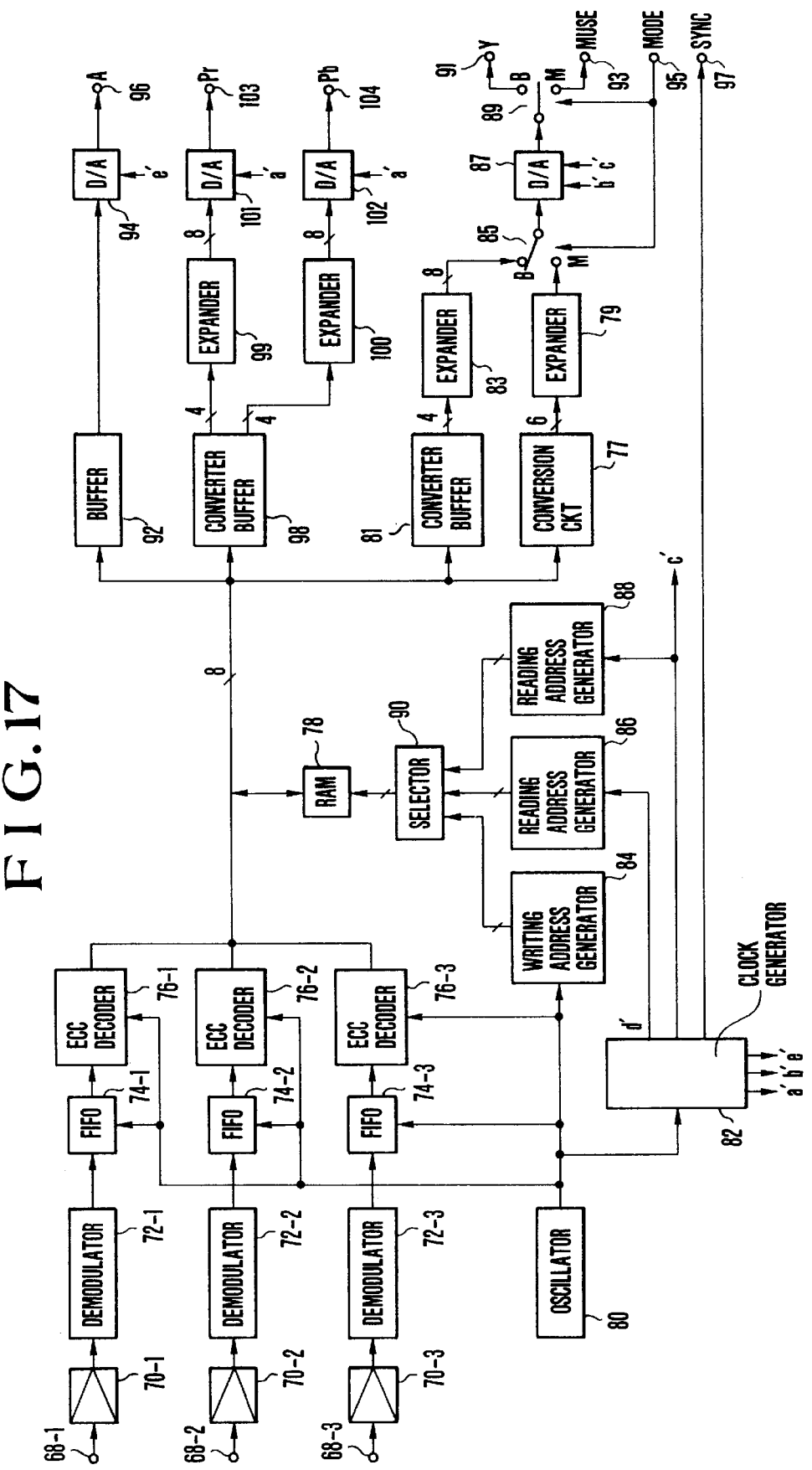
FIG. 17 is a block diagram showing the arrangement of the reproducing system of the digital VTR of FIG. 12.

FIG. 17 shows the arrangement of the reproducing system of a digital VTR of the third embodiment. In FIG. 17, the same component parts as those of FIG. 8 are indicated by the same reference numerals and the details of them are omitted from description.

In a case where the recorded signal is a digital MUSE signal, the digital MUSE signal which is compressed in the manner as described in the foregoing is output from a RAM 78 at a given rate. A conversion circuit 77 receives this MUSE signal which is an 8-bit digital signal. The circuit 77 converts the three symbols of this 8-bit digital signal into 6-bit data of four symbols. The 6-bit data is supplied to a band expander 79. The band expander 79 performs a DPCM decoding process. As a result, an 8-bit digital MUSE signal is output at a given rate.

Then, a mode signal MODE causes a data selector 85 to output the data from one side M thereof. This allows the digital MUSE signal to be supplied to a D/A converter 87. In this instance, the D/A converter 87 operates according to the clock signal "c'". The original analog MUSE signal is eventually output from an output terminal 93 through one side (terminal) M of a switch 89.

The digital VTR described above is arranged according to this invention to DPCM-code the MUSE signal without changing the data format of the signal at all. In decoding, therefore, the MUSE signal can be very easily recomposed. The audio signal is also DPCM-coded in exactly the same manner. The circuit arrangement of the VTR, therefore, can be simplified to a great degree.

The compressed digital MUSE signal is again converted into an 8-bit digital signal while the baseband signal which is separately compressed is also converted into an 8-bit digital signal. This arrangement enables the VTR to record either of these signals by using the same signal processing part in common in the ensuing part of the circuit arrangement.

While the MUSE signal is taken up by way of example in the foregoing description of each embodiment, the applicability of this invention is not limited to the MUSE signal. The invention is applicable to all the apparatuses of the kind arranged to handle a TV signal having a given period amount of a video signal and an audio signal for the same given period which are time-division-multiplexed with each other.

What is claimed is:

1. A digital information signal transmitting apparatus comprising:

a) input means for selectively inputting a first digital information signal containing image data or a second digital information signal containing audio data, the second digital information signal being inputted in an amount less than the first digital information signal during a predetermined period of time;

b) generating means for generating other data; and c) forming means for forming synchronizing blocks, said forming means composing the synchronizing block by dividing the first digital information signal inputted during the predetermined period of time into predetermined unit amounts of data when the first digital information signal is being inputted, and composing the synchronizing block by adding the other data generated by said generating means to the second digital information signal so as to equalize the data amount of the predetermined period of time to the data amount of the first digital information signal, and by dividing the second digital information signal added with the other data into the predetermined unit amounts of data, said forming means including error correction coding means for adding an error correction check code to the first and second digital information signals of the predetermined unit amounts of data, and wherein said error correction coding means functions in such a manner that the same predetermined data amount of the error correction check code is added to a synchronizing block irrespective of whether the synchronizing block contains the first digital information signal or the second digital information signal.

2. An apparatus according to claim 1, wherein the error correction coding means adds a predetermined number of symbols of error correction check code to the predetermined amount of data of digital information signal whenever the input means is inputting either of the first and second digital information signals.

3. An apparatus according to claim 1, wherein said input means is arranged to form at least one of said first and said second digital information signals by compressing a digital information signal.

4. An apparatus according to claim 1, further comprising recording means for recording data of the synchronizing block on a recording medium.

5. A digital information signal processing device comprising:

a) first input means for inputting a first digital information signal containing image data;

b) second input means for inputting a second digital information signal containing audio data, the second digital information signal being inputted in an amount less than the first digital information signal during a predetermined period of time;

c) generating means for generating other data;

d) forming means for forming synchronizing blocks, said forming means composing the synchronizing block by dividing the first digital information signal inputted during the predetermined period of time into predetermined unit amounts of data in case of the first digital information signal, and composing the synchronizing block by adding the other data generated by said generating means to the second digital information signal so as to equalize the data amount of the predetermined period of time to the data amount of the first digital information signal and by dividing the second digital information signal added with the other data into the predetermined unit amounts of data in case of the second digital information signal, said forming means including error correction coding means for adding an error correction check code to the first and second digital information signal of the predetermined unit amounts of data, wherein said correction coding means functions in such a manner that the error correction check code of the same predetermined amount of data is added to a synchronizing block irrespective of whether the synchronizing block contains the first digital information signal or the second digital information signal.

6. A device according to claim 5, further comprising recording means for recording data of the synchronizing block on a recording medium.

7. A digital information signal transmitting method comprising:

a) selectively inputting a first digital information signal containing image data or a second digital information signal containing audio data, the second digital information signal being inputted in an amount less than the first digital information signal during a predetermined period of time;

b) generating other date; and c) forming synchronizing blocks, said forming comprising composing the synchronizing block by dividing the first digital information signal inputted during the predetermined period of time into predetermined unit amounts of data when the first digital information signal is being inputted, and composing the synchronizing block by adding the other data generated in said generating step to the second digital information signal so as to equalize the data amount of the predetermined period of time to the data amount of the first digital information signal, and by dividing the second digital information signal added with the other data into the predetermined unit amounts of data, said forming further including adding an error correction check code to the first and second digital information signals of the predetermined unit amounts of data, and wherein said adding of the error correction check code is carried out in such a manner that the same predetermined data amount of the error correction check code is added to a synchronizing block irrespective of whether the synchronizing block contains the first digital information signal or the second digital information signal.

8. A digital information signal processing method comprising:

a) inputting a first digital information signal containing image data;

b) inputting a second digital information signal containing audio data, the second digital information signal being inputted in an amount less than the first digital information signal during a predetermined period of time;

c) generating other data;

d) forming synchronizing blocks, comprising:

composing the synchronizing block by dividing the first digital information signal inputted during the predetermined period of time into predetermined unit amounts of data in case of the first digital information signal, composing the synchronizing block by adding the other data generated in said generating step to the second digital information signal so as to equalize the data amount of the predetermined period of time to the data amount of the first digital information signal and by dividing the second digital information signal added with the other data into the predetermined unit amounts of data in case of the second digital information signal, and adding an error correction check code to the first and second digital information signals of the predetermined unit amounts of data, wherein the adding of the error correction check code is carried out in such a manner that the error correction check code of the same predetermined amount of data is added to a synchronizing block irrespective of whether the synchronizing block contains the first digital information signal or the second digital information signal.

* * * * *

UNITED STATES PATENT AND TRADEMARK OFFICE
CERTIFICATE OF CORRECTION

PATENT NO. : 6,055,357
DATED : April 25, 2000
INVENTOR(S) : Kenichi Nagasawa, et al.

It is certified that error appears in the above-identified patent and that said Letters Patent are hereby corrected as shown below:

Col. 4, line 37, delete "comprise" and insert --comprises--.

Signed and Sealed this

Fifteenth Day of May, 2001

Attest:

NICHOLAS P. GODICI

*Attesting Officer*  *Acting Director of the United States Patent and Trademark Office*